3,196,167
STEROID CONTAINING DIFLUOROAMINO
AND FLUOROIMINO GROUPS
Anestis L. Logothetis, Wilmington, Del., assignor to E. I. du Pont de Nemours and Company, Wilmington, Del., a corporation of Delaware
No Drawing. Filed Aug. 5, 1963, Ser. No. 300,109
14 Claims. (Cl. 260—397.2)

This invention relates to new steroids and to a method of preparing these compounds. More specifically, the invention concerns new steroids bearing difluoroamino or fluoroimino substituents on adjacent carbon atoms and to their preparation.

It has been found that the properties of steroid compounds can be altered by placing substituents on the steroid nucleus; thus, a great amount of research has been directed to the synthesis of steroid compounds. No work has been reported, however, in the area of difluoroamino and fluoroimino substituted steroids.

The new products of this invention are steroids having on each of the two adjacent annular carbon atoms in the (4,5) or (5,6) positions a difluoroamino, —$NF_2$, and a fluoroimino, =NF, substituent.

These compounds are prepared by the following one- or two-step process:

(a) Reacting dinitrogen tetrafluoride under essentially anhydrous conditions with a steroid containing an intracyclic carbon-to-carbon double bond, between the 4- and 5-carbons or the 5- and 6-carbons, whereby a 4,5- or 5,6-bis(difluoroamino) steroid is formed in accordance with the following simplified equation in which only the reactive portion of the molecule is shown:

(1) 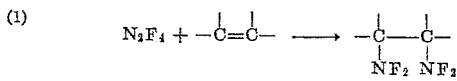

(b) Dehydrofluorination of the bis(difluoroamino) steroid of step (a) may be accomplished by reacting it with a hydrogen fluoride acceptor, whereby the difluoroamino groups which are attached to a carbon atom also bearing a hydrogen atom, i.e., to either the 4- or the 6-carbon atom, is converted to a fluoroimino group with formation of a 5-difluoroamino-4- or 6-fluoroimino steroid, in accordance with the simplified equation:

(2). 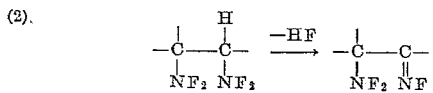

in which any valences of the depicted carbons not bonded to hydrogen is bonded to annular carbon of the steroid molecule.

The difluoroamino and fluoroimino steroids of this invention may, of course, bear any of the other substituents commonly present in the steroidal compounds. When these substituents are initially present in the unsaturated steroid serving as starting material, they should obviously be those which are not appreciably reactive with dinitrogen tetrafluoride, i.e., which are insufficiently reactive to prevent the desired reaction from proceeding to a useful extent. Examples of suitable substituents (hydrogen is not herein considered a substituent), which may be attached either to annular carbons or to exocyclic carbons, include hydrocarbon radicals (preferably low alkyl groups) and functional groups such as hydroxy, ether (hydrocarbyloxy), oxo, acyloxy, carboxyl, ester (hydrocarbyloxycarbonyl), oxido, acetal, carbonamido, cyano, nitro and halogen. Sensitive functions such as amino, dialkylamino, intracyclic unsaturation or exocyclic unsaturation (ethylenic or acetylenic) can, however, be introduced by known methods into the difluoroamino or fluoroimino steroid after it has been formed.

For reasons of greater accessibility, the unsaturated steroids preferred as starting materials are those which contain a total of from 18 to 36 carbon atoms.

In the first step of the process, the relative proportions of the two reactants (unsaturated steroid and $N_2F_4$) are not critical. For better utilization of the steroid and greater ease of separation of the reaction product, the $N_2F_4$ is generally used in at least molar equivalent with respect to the steroid, and preferably in slight to moderate excess thereover.

The reaction is conveniently conducted in an essentially inert organic liquid medium which dissolves the steroid to at least some extent, e.g., 5% by weight. Suitable solvents include hydrocarbons such as heptane, petroleum ether, cyclohexane, benzene or toluene; halohydrocarbons such as carbon tetrachloride, chloroform, 1,2-dichloroethane, 1,1,2-trichloro-1,2,2-trifluoroethane, hexafluoropropylene dimer, chlorobenzene; nitriles such as acetonitrile or benzonitrile; and the like. The reaction medium should be aliphatically saturated, to avoid side-reactions with the $N_2F_4$ and excessive consumption of the latter, and substantially anhydrous, since $N_2F_4$ is hydrolyzable.

The reaction proceeds at temperatures as low as about 25° C. but at too slow a rate to be practical. It is therefore preferred to operate at a temperature of at least 50° C., most usefully in the range of 50–200° C.

Since $N_2F_4$ is a gas boiling at about −73° C., the reaction is conducted in sealed vessels, either at the autogenous pressure developed by the reactants and solvent at the operating temperature or under additional external pressure, which may be any desired one, for example up to 5000 atmospheres or higher. Use is made of a reaction vessel whose inner surface resists chemical attack by $N_2F_4$, for example stainless steel, the commercial nickel-iron-molybdenum alloy known as "Hastelloy C," or platinum.

The resulting 4,5- or 5,6 bis(difluoroamino) steroid can be separated by any appropriate means, such as crystallization from a suitable solvent or chromatographic methods. These bis(difluoroamino) steroids are crystalline solids which, in contrast to many compounds containing N—F bonds, are perfectly stable and can be handled in complete safety.

In the optional second step of the process, the bis(difluoroamino) steroid is brought in intimate contact with a hydrogen fluoride acceptor under conditions which favor dehydrofluorination. Suitable hydrogen fluoride acceptors include the fluorides of alkali metals of atomic number 11–55 (sodium, potassium, rubidium and cesium fluorides); the carbonates of the same metals, and alkali metal alkoxides such as sodium or potassium methoxide or ethoxide. The hydrogen fluoride acceptor is advantageously used in at least the calculated amount, that is, in amounts of at least one mole (preferably more) per $NF_2$ group to be converted.

The reaction is conducted in a liquid medium which dissolves the steroid and preferably, but not essentially, has also at least some solvent power for the hydrogen fluoride acceptor. The halohydrocarbons and nitriles already mentioned in connection with the first step are suitable reaction media for this purpose, as are also ethers such as dioxane, tetrahydrofuran or 1,2-dimethoxyethane; sulfoxides such as dimethyl sulfoxide; amides such as dimethylformamide, and the like. While a small amount of water can usually be tolerated, the reaction medium is preferably substantially anhydrous.

The temperature of the dehydrofluorination reaction may be as low as about 25° C., particularly when using a combination of solvent and hydrogen fluoride acceptor such that the latter is dissolved to an apreciable extent. Generally speaking, the preferred range of temperature is that between 50 and 125° C., although higher temperatures, e.g., up to 200° C., can be used if desired.

The resulting reaction product can be separated and purified, if necessary, by crystallization or chromatographic methods.

These defluoroamino fluoroimino steroids, like the bis-difluoroamino steroids, are crystalline solids which can be handled in complete safety.

The —$NF_2$ and/or =NF substituted steroids obtained either by process (a) or by process (a) plus process (b) can in turn be subjected to other reactions (for example, hydrolysis, oxidation, esterification, etc.), using known procedures, in order to introduce other substituents or to replace substituents already present by others. The examples which follow illustrate some of these transformations.

In the following examples, the spatial configuration ($\alpha$ or $\beta$) of the difluoroamino group is not stated, since it is not known with certainty. Other substituents are designated as $\alpha$ or $\beta$ whenever their configuration is known.

EXAMPLE 1

*3β-acetoxy-5,6-bis(difluoroamino)cholestane*

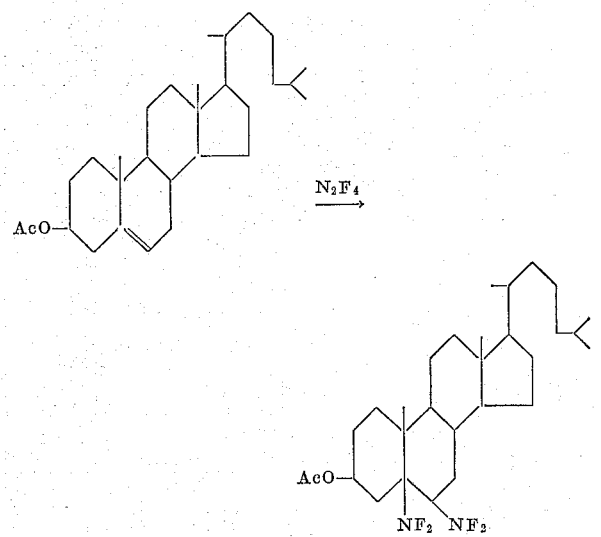

A solution of 10 g. (0.0236 mole) of cholesteryl acetate in 13 ml. of chloroform and 7 ml. of acetonitrile was placed in a collapsible platinum tube. The tube was cooled to —196° C., evacuated and 5.0 g. (0.0458 mole) of dinitrogen tetrafluoride was condensed in it, after which the tube was heated at 70° C. for 4 hours under 500 atm. external hydraulic pressure. After cooling, the tube was opened, excess $N_2F_4$ was allowed to evaporate, the solvent was removed under reduced pressure and the residue was crystallized from ethanol to give 8.0 g. (63% yield) of 3β-acetoxy-5,6-bis(difluoroamino)cholestane as colorless crystals, M.P. 129.5–130° C.

*Analysis.*—Calcd. for $C_{29}H_{48}F_4N_2O_2$: C, 65.39; H, 9.08; N, 5.26; F, 14.25. Found: C, 65.09; H, 9.17; N, 5.30; F, 13.91.

The infrared spectrum (KBr) showed absorptions at 5.73$\mu$ (acetate), 10.34, 10.45, 10.56, 10.67 (sh.), 10.90 and 11.58$\mu$ (N—F). The $F^{19}$ nuclear magnetic resonance spectrum further supported the assigned structure.

EXAMPLE 2

*3β-acetoxy-5-difluoroamino-6-fluoroiminocholestane*

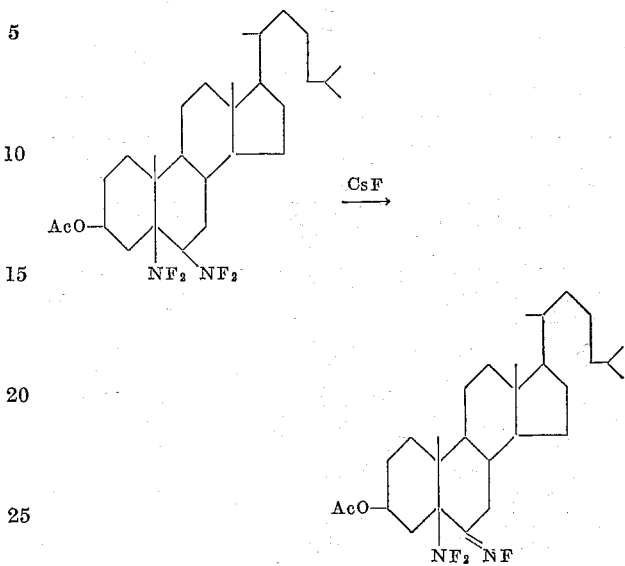

A mixture of 4.0 g. (0.0075 mole) of 3β-acetoxy-5,6-bis(difluoroamino)cholestane, 6.0 g. (0.045 mole) of cesium fluoride, 50 ml. of chloroform and 50 ml. of acetonitrile was heated to reflux (about 70° C.) for 4 hours. The mixture was then filtered and the filtrate was evaporated under reduced pressure to give a crystalline residue which, after recrystallization from ethanol, gave 2.4 g. (62.5% yield) of 3β-acetoxy-5-difluoroamino-6-fluoroiminocholestane as colorless needles, M.P. 165–166° C.

*Analysis.*—Calcd. for $C_{29}H_{47}F_3N_2O_2$: C, 67.98; H, 9.24; N, 5.46; F, 11.15. Found: C, 67.91; H, 9.10; N, 5.45; F. 10.90.

The infrared spectrum (KBr) showed absorptions at 5.75$\mu$ (acetate), 6.10$\mu$ (C=NF, weak), 10.25, 10.34, 10.55, 10.75, 10.85, 11.00 and 11.55$\mu$ (N—F). The $F^{19}$ n-m-r spectrum also supported the assigned structure.

EXAMPLE 3

*5,6-bis(difluoroamino)cholestane-3β-ol*

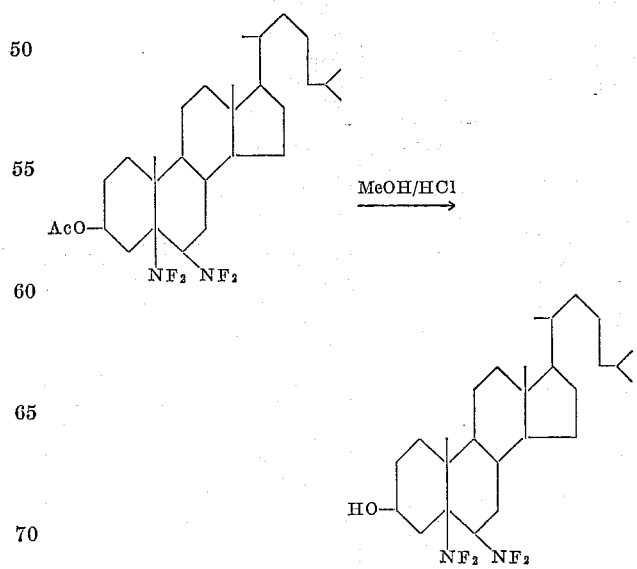

A mixture of 5.0 g. of 3β-acetoxy-5,6-bis(difluoroamino)cholestane, 150 ml. of methanol and 30 ml. of concentrated hydrochloric acid was stirred at 40° C. for 18 hours, then heated to reflux, and enough water was added to cause slight cloudiness. The precipitate which formed on cooling was collected by filtration. There was obtained 4.5 g. (95% yield) of 5,6-bis(difluoroamino)-cholestane-3β-ol as colorless crystals, M.P. 127–128° C.

Analysis.—Calcd. for $C_{27}H_{46}F_4N_2O$: C, 66.10; H, 9.45; N, 5.72; F, 15.50. Found: C, 65.89; H, 9.72; N, 5.44; F, 13.69.

The assigned structure was further supported by the $F^{19}$ n-m-r spectrum and the infrared spectrum, the latter showing absorption (Nujol mull) at 2.98μ (OH).

EXAMPLE 4

*5-difluoroamino-6-fluoroiminocholestane-3β-ol*

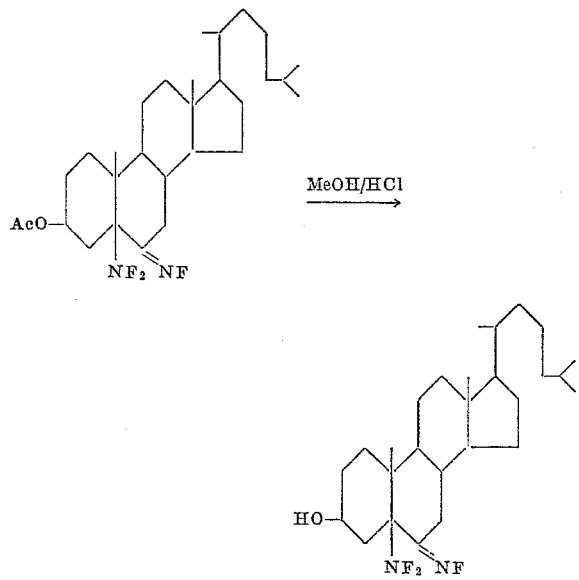

A solution of 5.0 g. of 3β-acetoxy-5-difluoroamino-6-fluoroiminocholestane, 200 ml. of methanol, 10 ml. of chloroform and 30 ml. of cencentrated hydrochloric acid was stirred at room temperature for 18 hours. On dilution with water, extraction of the organic product with chloroform and evaporation of the solvent an oily residue was obtained which, on crystallization from ethanol, gave 3.5 g. (76% yield) of 5-difluoroamino-6-fluoroiminocholestane-3β-ol as colorless crystals, M.P. 131–132° C.

Analysis.—Calcd. for $C_{27}H_{45}F_3N_2O$: C, 68.90; H, 9.64; N, 5.95; F, 12.13. Found: C, 68.09; H, 9.76; N, 5.91; F, 11.28.

The infrared spectrum (KBr) showed absorptions at 2.92μ (OH), 6.09μ (C=NF, weak), 11.58 and 12.33μ (N—F), and the $F^{19}$ n-m-r spectrum further supported the assigned structure.

The same compound was also obtained, although in poorer yield, by dehydrofluorinating 5,6-bis(difluoroamino)cholestane-3β-ol with cesium fluoride in refluxing acetonitrile/chloroform by the procedure of Example 2.

EXAMPLE 5

*5-difluoroamino-6-fluoroiminocholestane-3-one*

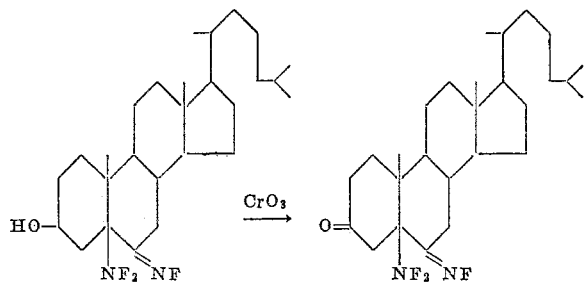

To a stirred solution of 2.7 g. (0.00575 mole) of 5-difluoroamino-6-fluoroiminocholestane-3β-ol in 50 ml. of acetone was slowly added an excess of Jones' reagent (solution of 10.3 g. of chromium trioxide in 30 ml. of water and 3.7 ml. of concentrated sulfuric acid; see Bowden, Heilbron, Jones and Weedon, J. Chem. Soc. 1946, 39). The mixture was stirred for one-half hour, after which the chromium salts were removed by filtration. The filtrate was diluted with water, extracted with petroleum ether and the petroleum ether was evaporated under reduced pressure to give a residual oil which, after crystallization from ethanol-water, gave 1.6 g. (60% yield) of 5-difluoroamino-6-fluoroiminocholestane-3-one as colorless crystals, M.P. 110–111° C.

Analysis.—Calcd. for $C_{27}H_{43}F_3N_2O$: C, 69.19; H, 9.25; N, 5.98; F, 12.17. Found: C, 68.92; H, 8.95; N, 5.75; F, 11.13.

The infrared spectrum (KBr) showed absorptions at 5.76μ (C=O), 6.0μ (C=NF, weak), 11.45, 11.64 and 12.05μ (N—F), and the $F^{19}$ n-m-r spectrum also supported the assigned structure.

EXAMPLE 6

*5,6-bis(difluoroamino)cholestane-3-one*

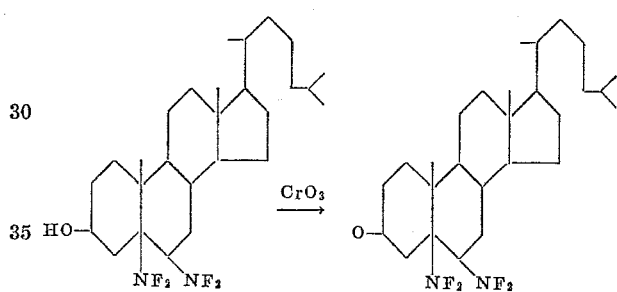

A solution of 5.0 g. (0.01 mole) of 5,6-bis(difluoroamino)cholestane-3β-ol in 50 ml. of acetone was slowly treated with an excess of Jones' reagent. The mixture was stirred at room temperature for one hour, the chromium salts were removed by filtration, the filtrate was diluted with water and extracted with diethyl ether. On evaporation of the ether under reduced pressure an oily residue was obtained which, on crystallization from ethanol-water, gave 2.5 g. (50% yield) of 5,6-bis(difluoroamino)cholestane-3-one as colorless crystals, M.P. 127–128° C.

Analysis.—Calcd. for $C_{27}H_{44}F_4N_2O$: C, 66.39; H, 9.08; N, 5.73; F, 15.56. Found: C, 66.20; H, 8.84; N, 5.70; F, 14.81.

The assigned structure was supported by the $F^{19}$ n-m-r spectrum and by the infrared spectrum (Nujol mull) showing absorptions at 5.80μ (C=O), 10.42, 10.55, 10.70, 11.50 and 11.70μ (N—F).

The foregoing examples are to be considered as illustrative rather than limitative, since the described process is broadly applicable to the preparation of steroids having a difluoroamino substituent on the 5-carbon and either a difluoroamino or a fluoroamino substituent on one of the 4- or 6-carbons from any steroid having intracyclic carbon-to-carbon unsaturation between the 4- and 5- or the 5- and 6-carbons.

From the standpoint of steroid classification, the products of greatest interest in this invention are the bis(difluoroamino) and difluoroamino-fluoroamino steroids (with the substituents at the previously stated positions) of the following classes: estranes, androstanes, pregnanes, cholanes, cholestanes, ergostanes and stigmastanes.

Since the preferred starting materials are the intracyclically unsaturated steroids containing from 18 to 36 carbon atoms, the preferred products of the invention are correspondingly the bis(difluoroamino), and the difluoroamino-fluoroimino steroids having from 18 to 36 carbon atoms.

Additional specific examples of unsaturated steroids which can be reacted with dinitrogen tetrafluoroide include those listed below together with the resulting reaction products, the bis(difluoroamino) steroids, and their dehydrofluorination products, that is, the difluoroamino-fluoroimino steroids. These products are obtainable by the disclosed procedures, as illustrated in Examples 1 and 2, respectively. It is to be noted in connection with these additional examples that, if desired, the substituents shown (other than the —$NF_2$ or =NF groups) can in most cases be replaced by other substituents through application of known methods such as hydrolysis, oxidation, esterification, etherification, acetalization and the like.

| | Starting Material | Reaction Products |
|---|---|---|
| 7 | (steroid with OAc at 17β and 3-ethylenedioxy group) | 17β-acetoxy-3-ethylenedioxy-5,6-bis(difluoroamino)-androstane and 17β-acetoxy-3-ethylenedioxy-5-difluoroamino-6-fluoroiminoandrostane. |
| 8 | (steroid with OAc at 17β and AcO at 3, B-norandrostane) | 3β,17β-diacetoxy-5,6-bis(difluoroamino)-B-norandrostane and 3β,17β-diacetoxy-5-difluoroamino-6-fluoroimino-B-norandrostane. |
| 9 | (pregnane with CHOAc-CH₃ side chain, 3,11-dione, 6α,9α-difluoro) | 20β-acetoxy-6α,9α-difluoro-4,5-bis(difluoroamino)pregnane-3,11-dione and 20β-acetoxy-6α,9α-difluoro-4-fluoroimino-5-difluoroaminopregnane-3,11-dione. |
| 10 | (17α-methyl-17β-ol estrane with 3-AcO) | 3β-acetoxy-5,6-bis(difluoroamino)-17α-methylestrane-17β-ol and 3β-acetoxy-5-difluoroamino-6-fluoroimino-17α-methylestrane-17β-ol. |
| 11 | (cholanic acid with 3-OH) | 5,6-bis(difluoroamino)-3β-hydroxycholanic acid and 5-difluoroamino-6-fluoroimino-3β-hydroxycholanic acid. |
| 12 | (16α,17α-oxidopregnane-20-one with 3-AcO) | 3β-acetoxy-5,6-bis(difluoroamino)-16α,17α-oxidopregnane-20-one and 3β-acetoxy-5-difluoroamino-6-fluoroimino-16α,17α-oxidopregnane-20-one one. |

| | Starting Material | Reaction Products |
|---|---|---|
| 13 | (steroid with CH₃, C₂H₅ side chain CH—(CH₂)₂—CH—CH(CH₃)₂, HO— at 3β, Δ5) | 5,6-bis(difluoroamino)-stigmastane-3β-ol and 5-difluoroamino-6-fluoroiminostigmastane-3β-ol. |
| 14 | (steroid with CH₃, CHOAc side chain, AcO—, Δ5) | 3β,20β-diacetoxy-4,5-bis-(difluoroamino) pregnane and 3β,20β-diacetoxy-4-fluoroimino-5-difluoroaminopregnane. |
| 15 | (steroid with 17β-OH, 3-keto, Δ4) | 4,5-bis(difluoroamino)-17β-hydroxyandrostane-3-one and 4-fluoroimino-5-difluoroamino-17β-hydroxyandrostane-3-one. |
| 16 | (steroid with CH₃, CO side chain, 3-keto, Δ4) | 4,5-bis(difluoroamino)-pregnane-3,20-dio and 4-fluoroimino-5-difluoroaminopregnane-3,20-dione. |

Steriods modified by the introduction of difluoroamino and/or fluoroimino groups possess unexpected and useful biological properties. Subcutaneous administration of, for example, 5,6-bis(fluoroamino)cholestane-3-ol and 5-difluoroamino-6-fluoroiminocholestane-3-ol to young male rats caused a marked inhibition of prostate gland growth without retarding body growth or testicular development. This finding is unexpected since the cholesterol structure normally lacks hormonal properties and discloses the usefulness of the products of the invention in the treatment of androgen-dependent enlargements of the prostate gland.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A steroid selected from the class consisting of estranes, androstanes, pregnanes, cholanes, cholestanes, ergostanes and stigmastanes wherein said steroids contains as part of the polycyclic structure a grouping selected from the class consisting of

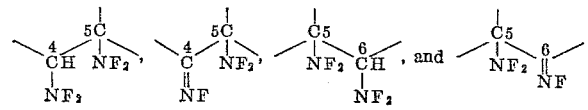

2. A steroid of claim 1 wherein said grouping is

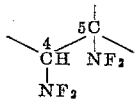

3. A steroid of claim 1 wherein said grouping is

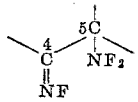

4. A steroid of claim 1 wherein said grouping is

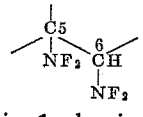

5. A steroid of claim 1 wherein said grouping is

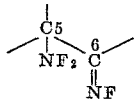

6. 3β-acetoxy-5,6-bis(difluoroamino)cholestane.
7. 3β-acetoxy-5-difluoroamino-6-fluoroiminocholestane.
8. 5,6-bis(difluoroamino)cholestane-3-one.
9. 5-difluoroamino-6-fluoroiminocholestane-3β-ol.
10. 5-difluoroamino-6-fluoroiminocholestane-3-one.
11. A process which comprises reacting dinitrogen tetrafluoride with a steroid containing a double bond between carbon atoms selected from the position consisting of (4,5) and, (5,6) said steroid being selected from the class consisting of estranes, androstanes, pregnanes, cholanes, cholestanes, ergostanes and stigmastanes.

12. A process which comprises reacting a dehydrofluorinating agent selected from the group consisting of alkali metal fluorides, alkali metal carbonates, alkali metal methoxide and alkali metal ethoxide, with a steroid containing an —$NF_2$ group in the 5- position and an —$NF_2$ group in a position selected from the class consisting of 4- and 6-, said steroid being selected from the class consisting of estranes, androstanes, pregnanes, cholanes, cholestanes, ergostanes and stigmastanes, in a medium which dissolves the steroid.

13. The process of claim 11 wherein the steroid reactant is cholesteryl acetate.

14. The process of claim 12 wherein the steroid reactant is 3β-acetoxy-5,6-bis(difluoroamino)cholestane, the dehydrofluorinating agent is CsF and the medium is a mixture of chloroform and acetonitrile.

No references cited.

LEWIS GOTTS, *Primary Examiner*.